May 30, 1933. H. M. JALANDONI 1,911,692
FERTILIZER TOOL
Filed May 19, 1932 2 Sheets-Sheet 1
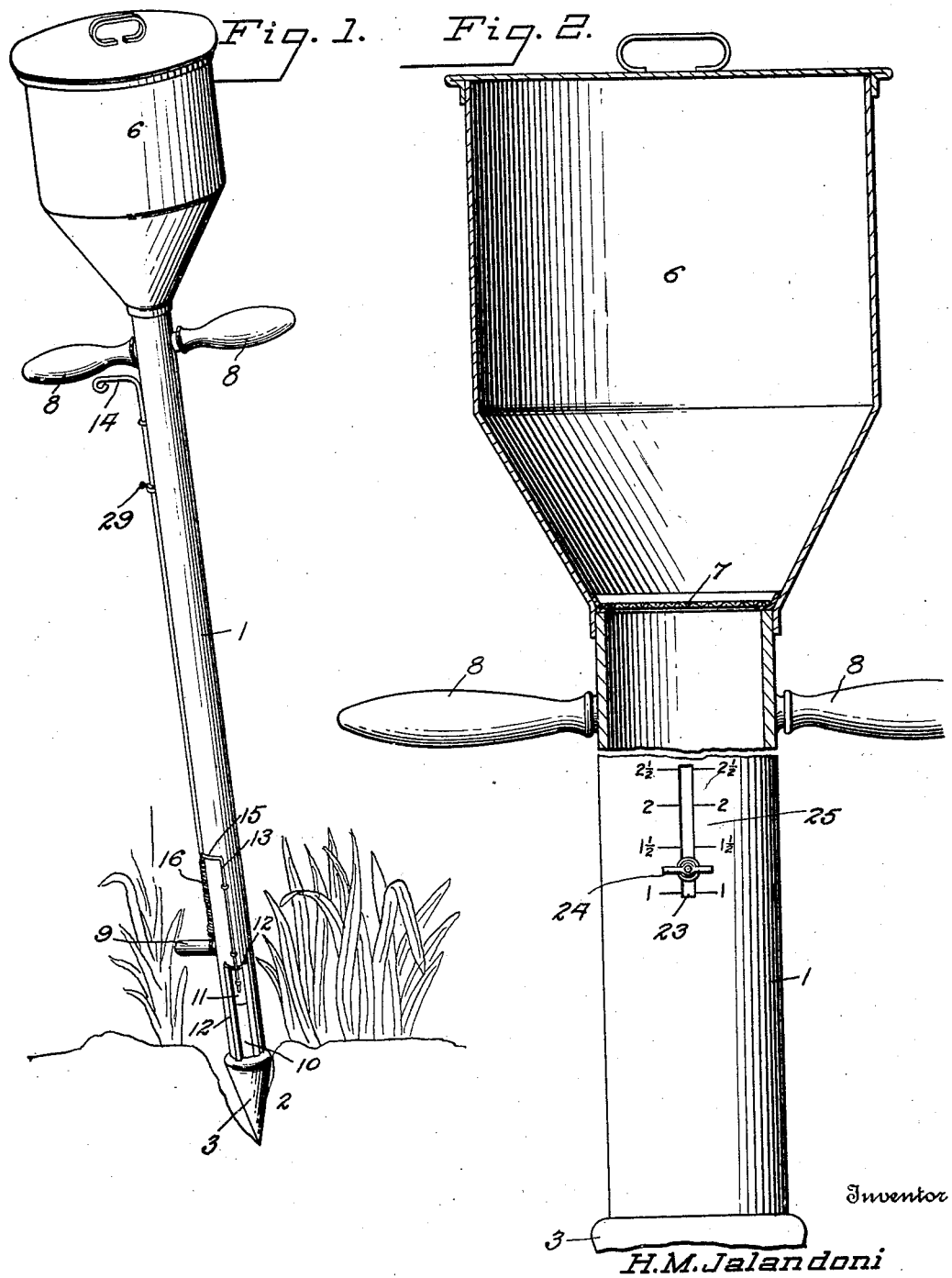
Inventor
H.M. Jalandoni
By Lacey & Lacey, Attorneys May 30, 1933. H. M. JALANDONI 1,911,692
FERTILIZER TOOL
Filed May 19, 1932 2 Sheets-Sheet 2
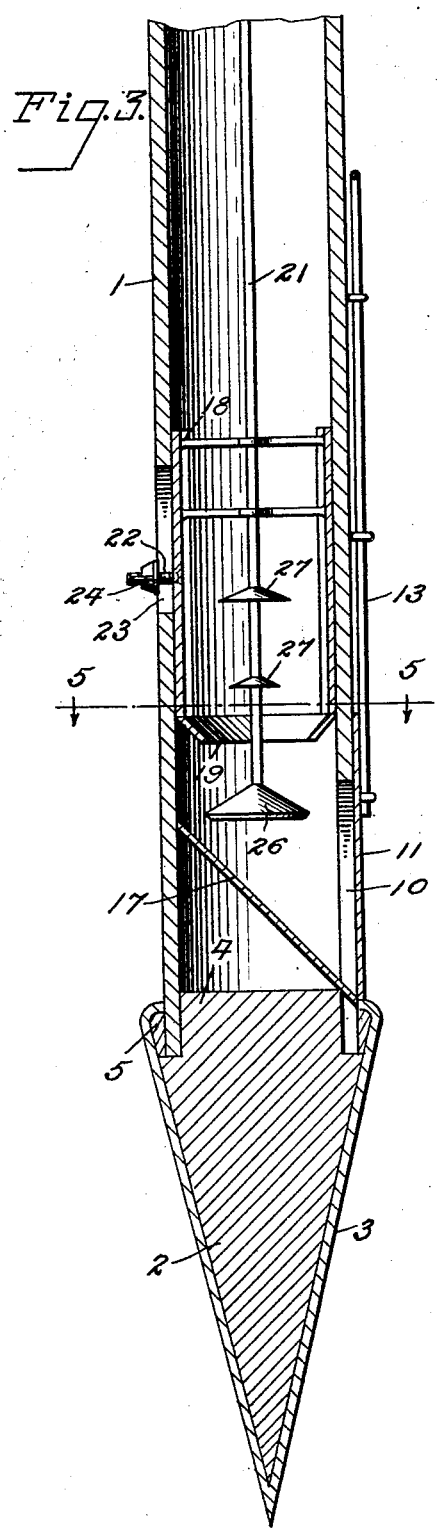
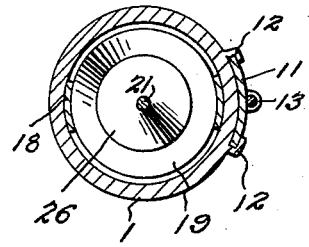
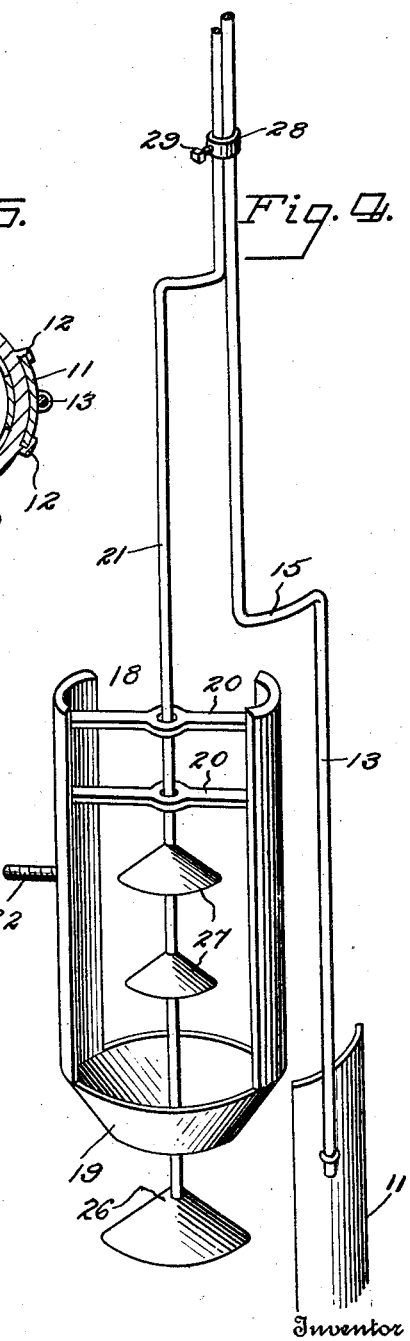
Inventor
H. M. Jalandoni
By Lacey & Lacey, Attorneys Patented May 30, 1933

1,911,692

UNITED STATES PATENT OFFICE

HECTOR MONTINOLA JALANDONI, OF POTOTAN, PHILIPPINE ISLANDS

FERTILIZER TOOL

Application filed May 19, 1932. Serial No. 612,332.

This invention relates to the fertilization of plants and has for its object the provision of a simple and easily manipulated tool by the use of which powdered fertilizer may be embedded in the ground immediately adjacent the roots of the plants. Another object of the invention is to provide means whereby a measured quantity of fertilizer will be discharged at each operation and the discharge of a greater quantity will be avoided. A further object is to provide means whereby the quantity of fertilizer discharged at each operation may be regulated at will, and other objects will appear incidentally in the course of the following description. The invention is illustrated in the accompanying drawings and resides in certain novel features which will be particularly pointed out in the appended claims.

In the drawings, Fig. 1 is a perspective view of the tool illustrating the manner in which it is used, Fig. 2 is a view partly in vertical section and partly in elevation, Fig. 3 is an enlarged section through the lower portion of the tool, Fig. 4 is a perspective view illustrating the arrangement of the valve for controlling the discharge and the means for measuring a charge, Fig. 5 is a horizontal section on the line 5—5 of Fig. 3.

In carrying out the invention, there is provided a tubular body 1 which may be of any approved dimensions and is preferably of some material which will resist the chemical action of the fertilizer and will not easily oxidize. This tubular body 1 is provided, at its lower end, with a prong 2 consisting of a downwardly tapered wooden body having a metallic sheath 3 applied to its entire surface. The wooden body 2 is formed with a reduced portion or tenon 4, at its upper end, which fits closely within the lower end of the tubular body 1 and the upper extremity of the metallic sheath 3 is secured around the lower end of the tube by any suitable cementitious body, indicated at 5. The upper end of the tube 1 carries a hopper 6 which has a tapered lower end secured directly upon the upper end of the tube, and at the lower end of the hopper is a screen 7 of fine mesh wire netting whereby the fertilizer passing into the tube will be further pulverized so that the large clumps which may tend to form will be broken up and the fertilizer passing to the plant will be in the desired condition. At its upper end, the tube 1 is provided with handles 8 which are to be grasped by the user for the purpose of guiding and steadying the tool while it is in use, and for carrying the same from place to place. Near its lower extremity, a foot rest 9 is secured to the side of the tube 1 and is intended to receive pressure from the foot of the user so that the point of the tool may be readily forced into the ground.

The tube 1 is provided, at its lower end, in one side, with an outlet opening 10, through which the fertilizer is discharged, and this opening is normally covered by a slide valve or cut-off 11 which is mounted in vertical guides 12 provided on the tube at the sides of the opening, as will be understood. An operating rod 13 is secured at its lower end to the slide or cut-off 11 and is mounted in suitable eyes or guides upon the side of the tube, extending up along the tube to a point near the handles 8 where it is formed into or provided with a finger piece or grip, as indicated at 14. The operating rod 13 is preferably provided, at an intermediate point of its length, with a lateral bend 15 whereby it will conform to and pass partly around the tube, and to this bend is attached the upper end of a retractile spring 16 which has its lower end attached to the foot rest 9, as shown in Fig. 1. The valve is thus yieldably held normally in its lowered position to cut off the outflow of the fertilizer and will be immediately returned to such position when the grip 14 is released, it being understood that when the fertilizer is to be discharged the grip is seized and the rod 13 is pulled upwardly so that the outlet opening 10 will be uncovered. Within the tube, immediately adjacent the outlet opening 10, is an inclined deflecting plate or chute 17 which is inclined downwardly toward the lower end of the outlet opening, as shown in Fig. 3, whereby the fertilizer will be directed positively to the opening and will immediately flow through the same when it is uncovered. Above the deflecting plate 17, an inner frame 18 is fitted within the tube 1 and this frame may be of any suitable material and is preferably of the skeleton form shown clearly in Figs. 3 and 4, there being side members fitting closely to the inner surface of the tube and connected at their lower ends by a tapered ring or funnel 19. Near their upper ends, the side members are connected by cross bars 20 which serve to impart rigidity to the frame and also serve as guides for an operating rod 21. One side member of the frame 18 is equipped with a threaded stud 22 which extends through a longitudinal slot 23 in the tube and is equipped with a wing nut 24 adapted to be turned home against the side of the tube so as to hold the frame firmly in a set position. A scale, indicated at 25, is provided upon the tube, at the side of the slot 23, so that the frame may be accurately adjusted according to the quantity of fertilizer which is desired to be discharged at each operation. The operating rod 21 extends upwardly axially within the tube 1 and has its lower end disposed below the funnel 19 and equipped with a cut-off 26 which is adapted to fit closely within the opening of the funnel 19 and thereby prevent downflow of the fertilizer, it being understood, of course, that the upper edge of the funnel fits closely to the inner surface of the tube, as shown in Fig. 3. Above the funnel the rod 21 is equipped with agitators 27 of any approved form which serve to keep the fertilizer in a comminuted condition and also facilitate its downward passage through the funnel when the cut-off 26 is in its lowered position. The upper end of the operating rod 21 is carried through an opening provided therefor in the wall of the tube 1 and is connected with the operating rod 13 by a collar 28 which encircles the two rods and is equipped with a set screw 29 adapted to be turned home against either rod so that they will be clamped firmly within the collar.

From the foregoing description, taken in connection with the accompanying drawings, it will be seen that I have provided a very simple and inexpensive tool by the use of which a measured charge of fertilizer may be embedded in the soil immediately adjacent the roots of plants. The hopper and tube are filled while the slide valve 11 is lowered, as shown in Fig. 3, to cover the outlet opening 10 and the space between the funnel 19 and the deflecting plate 17 will consequently be filled with the fertilizer and will constitute one charge. When the fertilizer is to be discharged, the prong or point is forced into the ground by pressure applied to the foot rest 9 and the handles 8, in an obvious manner, after which the rod 13 is pulled upwardly to withdraw the cut-off 11 from over the opening 10 whereupon the fertilizer will flow through the outlet opening and settle in the soil adjacent the plant roots. When the slide 11 is drawn upwardly, the cut-off 26 will be also drawn upwardly so as to seat in the lower end of the funnel 19 and thereby cut off further flow of fertilizer through the funnel, the fertilizer resting on the cut-off readily flowing over its downwardly inclined surface and passing therebelow. When the operating rod 13 is released, the spring 16 at once returns it to its normal lowered position so as to cut off further flow and this action also causes a downward movement of the rod 21 and the cut-off 26 so that another charge of fertilizer may pass through the funnel. The agitators 27 will move downwardly, of course, with the rod 21, and will thereby facilitate the downward flow of the fertilizer. It will be understood that the space between the funnel and the deflecting plate 17 constitutes a measuring chamber so that a predetermined quantity of the fertilizer will be discharged at each operation. When the frame 18 is set at a higher point, the funnel will be, of course, at a greater distance from the deflector 17 and the measuring chamber will, consequently, accommodate a larger quantity of the material while, if the frame be set at a lower point, the capacity of the chamber will be accordingly diminished. By the use of this tool, the fertilizer is embedded in the soil in measured quantities so that waste of the material is avoided and the labor of fertilization will be reduced from that required by the manual methods now generally employed. The device is intended primarily for use in cultivating sugar cane crops but is, of course, adapted for use in the cultivation of any crop.

Having thus described the invention, I claim:

1. A fertilizer-distributing tool comprising a tubular body having an outlet in its side at its lower end, means within the body for directing material to and through the outlet, means mounted upon the tube to close or open the outlet, and means cooperating with the material directing means and adjustable vertically within the tubular body for determining the quantity of material to be discharged.

2. A fertilizer-distributing tool comprising a tubular body having an outlet in its side at its lower end and provided with guide flanges at said outlet, a cut-off slidably mounted for vertical movement between said guide flanges for covering and uncovering the outlet, a funnel within the tube above the outlet, and a cut-off operatively connected with the first-mentioned cut-off and controlling the flow from the funnel whereby a measured quantity of the material will be discharged at each operation.

3. A fertilizer-distributing tool comprising a tubular body having an outlet in its side at its lower end, a deflecting plate within the tubular body to direct material to and through the outlet, a cut-off mounted upon the body to cover and uncover the outlet, a funnel within the body above the outlet, and a cut-off adapted to seat in the bottom of the funnel and operatively connected with the first-mentioned cut-off whereby when the outlet is uncovered flow through the funnel will be arrested.

4. A fertilizer-distributing tool comprising a tubular body provided with an outlet in its side at its lower end, a cut-off controlling the flow through the outlet, a funnel within the tubular body above the outlet, a cut-off adapted to seat in the bottom of the funnel and operatively connected with the first-mentioned cut-off whereby when the outlet is uncovered the flow through the funnel will be arrested, and agitators disposed above the second-mentioned cut-off and connected therewith whereby to facilitate the flow through the funnel.

5. A fertilizer-distributing tool comprising a tubular body provided with an outlet in its side at its lower end, a cut-off controlling the flow through the outlet, a frame adjustably secured within the tubular body above the outlet and provided with a funnel at its lower end, a cut-off adapted to seat on the bottom of the funnel, and means for simultaneously operating the two cut-offs including a rod extending through and guided by the adjustably secured frame.

6. A fertilizer-distributing tool comprising a tubular body, a tapered prong secured to the lower end of the body, a foot rest on the body near the lower end of the same, handles secured on the body near the upper end thereof whereby pressure may be applied thereto to cause the point to enter the soil, and means disposed within and adjustable vertically of the body whereby to discharge a measured quantity of fertilizers.

In testimony whereof I affix my signature.

HECTOR M. JALANDONI. [L. S.]